(12) United States Patent
Wachauer

(10) Patent No.: US 6,595,534 B1
(45) Date of Patent: Jul. 22, 2003

(54) VEHICLE UNDERCARRIAGE

(76) Inventor: Oskar Wachauer, A-8795, Radmer 39a (AT)

(*) Notice: Subject to any disclaimer, the term of this patent is extended or adjusted under 35 U.S.C. 154(b) by 0 days.

(21) Appl. No.: 09/821,461

(22) PCT Filed: Oct. 5, 1999

(86) PCT No.: PCT/AT99/00238

§ 371 (c)(1),
(2), (4) Date: Apr. 6, 2001

(87) PCT Pub. No.: WO00/20237

PCT Pub. Date: Apr. 13, 2000

(30) Foreign Application Priority Data

Oct. 6, 1998 (AT) .......................................... A. 1664/98

(51) Int. Cl.[7] .............................................. B60G 11/20
(52) U.S. Cl. .............................................. 280/124.166
(58) Field of Search ................... 280/124.166, 124.164, 280/124.165, 124.169, 679

(56) References Cited

U.S. PATENT DOCUMENTS

| | | | |
|---|---|---|---|
| 1,385,611 A | * 7/1921 | Gangloff | ..................... 180/299 |
| 2,049,474 A | 8/1936 | Smith | |
| 3,687,479 A | 8/1972 | Kober | |
| 4,261,591 A | * 4/1981 | Warne, Jr. | .................. 267/276 |
| 4,966,386 A | 10/1990 | Werdich | |
| 5,215,331 A | 6/1993 | Pittman | |
| 5,411,286 A | 5/1995 | Pittman | |
| 5,816,606 A | 10/1998 | Cruise et al. | |

FOREIGN PATENT DOCUMENTS

| | | |
|---|---|---|
| DE | 4110571 | 12/1991 |
| DE | 4444850 | 6/1996 |
| DE | 19739064 | 4/1998 |
| EP | 0229591 | 7/1987 |
| EP | 0681932 | 11/1995 |
| FR | 759949 | 2/1934 |
| FR | 1158530 | 6/1958 |
| GB | 684538 | 12/1952 |
| GB | 734267 | 7/1955 |
| GB | 839226 | 6/1960 |
| GB | 941164 | 11/1963 |
| GB | 2306139 | 4/1997 |
| GB | 2317151 | 3/1998 |
| WO | 88/00534 | 1/1988 |
| WO | 97/12772 | 4/1997 |

OTHER PUBLICATIONS

Japanese Patent Abstracts of No. 601245512, published Jul. 3, 1985.

* cited by examiner

Primary Examiner—Paul N. Dickson
Assistant Examiner—Faye M. Fleming
(74) Attorney, Agent, or Firm—Greenblum & Bernstein, P.L.C.

(57) ABSTRACT

The invention relates to a vehicle undercarriage (1) or chassis for a vehicle, especially for a four-wheeled, driven vehicle for transporting at least one person. At least one main frame (2) is provided, said main frame (2) being configured as an arrangement of closed hollow profiles. The main frame (2) also has diametrically opposed torsion springs (4), whose axis of revolution runs crosswise in relation to the direction of travel. The torsion springs (4) are connected to side hollow profiles (3) of the main frame (2) with gusset plates (5). A flexurally resistant connecting pin (7) is provided on the torsion springs (4) with an oscillating lever (6), the connecting pin having a mounting (8) at its ends for the wheels.

21 Claims, 4 Drawing Sheets

VEHICLE UNDERCARRIAGE

CROSS-REFERENCE TO RELATED APPLICATIONS

The present application is a U.S. National Stage Application of International Application No. PCT/AT99/00238 filed Oct. 5, 1999, and claims priority of Austrian Patent Application No. A 1164/98, filed on October 6, 1998.

BACKGROUND OF THE INVENTION

1. Field of the Invention

The invention relates to a vehicle undercarriage or chassis for a vehicle especially for a four-wheeled, driven vehicle for transporting at least one person.

2. Discussion of Background Information

Vehicle carriages for multi-track motor vehicles, whereby the wheel suspension is provided by torsion springs, are well known and widespread. Thereby, a distinction must basically be made between two different embodiments, namely the crank axle and the cam-lever shaft.

In the crank axle, the wheel axle is arranged on an elastically rotatable arm, whereby the arm changes its angle in relation to the axle suspension with changing wheel load. The return torque usually increases with the change in angle, thus providing a rebound force on the wheel axle that acts in the opposite direction of the forces of inertia. The only degree of freedom for movement in such an arrangement is the elastically limited rotation around the torsion spring element, so that with sufficiently stiff design of the arrangement a defined wheel guidance is obtained in the other directions of movement. The torsion spring element can be designed as a metal rod in the axis direction of the free rotational motion, or as an elastomer spring element that is deformed primarily by shearing. Since each wheel is guided by a separate crank guide, independent capability of movement of the wheels is achieved, i.e. independent wheel suspension. The crank axis represented here is used preferably in load-bearing vehicles with relatively stiff suspension. The torsion spring may have high torsion stiffness, so that it has sufficient stiffness as a guiding element for the additional degrees of freedom of wheel movement. The disadvantage of this embodiment is the fact that in passenger vehicles the suspension must be softer for reasons of comfort. However, with a softer suspension the torsion spring can no longer manage the wheel guidance satisfactorily. Such inadmissible bump steers and camber changes under changing wheel loads lead to an unstable behavior of the vehicle.

In the embodiment with a cam-lever shaft, the spring energy is also stored in a component that counters its twist with the relevant torque. It differs from the crank axle in that further directions of movement can partly be restricted by separate elements. For example, embodiments are known in which only longitudinal guidance of the wheel in the direction of movement is achieved by the spring. Lateral guidance and maintenance of the track and camber angle are provided by the split axle of the wheel drive. With this arrangement, stiff wheel guidance in all directions except the compression is easier to achieve in terms of construction. However, it is also possible to guide solely the compression vertically to the tire contact area using the oscillating lever, whilst defining all the other directions of movement with a suitable wheel suspension. The disadvantage of this design is the high construction cost, which also results in a high degree of failure.

SUMMARY OF THE INVENTION

The present invention provides a vehicle undercarriage of the type mentioned at the beginning, which on the one hand avoids the disadvantages described above and on the other hand makes use of the constructional simplicity of the crank axle, whereby the restriction of lacking wheel guidance in the case of soft suspension is avoided.

The invention provides a vehicle undercarriage that includes at least one main frame. The main frame is configured as an arrangement of closed hollow profiles and diametrically opposed torsion springs having axes of revolution crosswise to a direction of travel. The torsion springs are connected to the lateral hollow profiles of the main frame with gusset plates, and a flexurally resistant connecting pin is provided on the torsion springs with an oscillating lever. The connecting pin has a mounting at its ends for the wheels.

The surprising advantage resulting from the above-noted features of the invention lies in the fact that optimal wheel guidance that guarantees stable driving behavior of the vehicle is achieved with an extremely simple construction. By designing the main frame with hollow profiles joined together in such a way as to be flexure- and torsion-resistant, the superstructure of the vehicle itself is also advantageously torsion-resistant. Moreover, the arrangement of the torsion springs offers the advantage that in addition to a high degree of material utilization for the elastic element of the suspension it is also possible to design wheel guidance functions using this suspension. The flexurally stiff connecting pin is provided as wheel guidance element. In addition, this flexurally resistant connecting pin offers the advantage that bump steer and camber change of the wheels are linked more or less rigidly by a connecting pin. Therefore, track width, toe angle and camber angle are invariant towards the plane through the contact points of the wheels on the contact surface.

It is advantageous that an embodiment of the instant invention also includes that all connections between the individual parts are made exclusively with welding joints, since it allows rational manufacturing, possibly even with the use of welding robots.

In an advantageous embodiment the torsion spring includes of two concentrically arranged hollow profiles, whereby at least one elastomer element is provided between the hollow profiles, preferably in the area of mounting of the oscillating lever. In a further advantageous embodiment, the torsion spring includes an outer torsion spring tube, an elastomer spring element and a torsion spring axis. These torsion springs provide a sufficient longitudinal stiffness in the direction of their axis of rotation and on the plane vertical to this axis.

In the embodiment in which the main frame includes of two lateral hollow profiles and two torsion spring tubes configured as a roughly ring-shaped, flexure- and torsion-resistant arrangement, it is possible to achieve optimal flexural and torsion stiffness for the main frame.

In a further embodiment, the connection between the lateral hollow profiles and the torsion spring tubes or other connecting profiles is achieved by preferably flat gusset plates arranged on both sides of the lateral hollow profile. Thus, a torsion-resistant connection of the hollow profiles is achieved by the special arrangement of the gusset plates on both sides of the profile. The gusset plates are necessary in order to connect at least two profiles with any connecting angle with each other rigidly by means of welding. The profiles may have the same vertical parting sections. Unlike gusset plates in conventional framework constructions, in the profile rods of which traction and pressure forces usually occur, flexural and torsion forces also have to be transmitted in this construction.

The gusset plates should be arranged on both sides of the profiles so that the welding seam is located in the neutral plane of the main flexural stress of each connecting profile. As a result, expansion stress on the welding seam in such a case of stress can be avoided. This fact has an advantageous effect on the stability of the welding seam.

Due to the bilateral arrangement of the gusset plates on the connecting profiles, however, stress with a general direction, such as e.g. flexion, torsion, traction or pressure, can be transferred without an unfavorable strain on the welding seams. The type and level of the collective stress has a structural impact on the design of the gusset plate. The construction principle itself remains unaffected.

The advantage of this type of gusset connection includes the fact that separate profile sections, which are easy to manufacture, can be used even for complex framework geometries under any stresses vertical to the profile axis.

The embodiment in which the connecting pin is configured as an open profile with low torsion resistance in the area between the oscillating levers is also advantageous, since profiles of this type unite a high flexural resistance with low torsion resistance.

With the embodiment including a connecting pin having a flexure- and torsion-resistant reinforcement in the area between the oscillating lever (6) and the mounting (8), in particular the steering stub mounting and further embodiment including the connecting pin designed as a hollow profile in the area between the oscillating lever and the mounting, in particular the steering stub mounting, the torsion resistance of the connecting pin can be varied in accordance with the length of reinforcement, and it can be calculated in advance. Since the ratio between flexural stiffness and torsion resistance of a profile rod is variable in many areas with the design of the profile cross-section, the wall thickness, dimensions and/or profile design, it is possible to link the individual compressions of an axle with each other. By increasing the torsion resistance of the connecting pin accordingly, there is stronger coupling of the compression, so that the rolling angle of the vehicle, i.e. rotational movement around the longitudinal axis, can be prevented specifically. This is imperative especially in superstructures that create an elevated vehicle center of gravity.

Embodiments including the oscillating lever being connected rigidly to the connecting pin; or including the oscillating lever being designed so as to have low torsion resistance along its longitudinal axis; or including the oscillating lever having a thin-walled, flat shape are also advantageous. A variable compression invariably causes torsional flexing of the connecting pin in relation to the vehicle superstructure. In this case, twisting is forced upon the oscillating levers, which are connected rigidly to the connecting pin on the one hand, and can exclusively perform a rotational movement crosswise to the direction of travel. Therefore, the oscillating levers should advantageously be designed so as to have low torsion resistance along the longitudinal axis, in order to be able to achieve the necessary axle compression. This may be achieved with a thin-walled, flat design of the oscillating levers. Lateral forces such as those acting on the vehicle with every change in direction would cause an inadmissible deformation of the oscillating levers crosswise to the direction of travel.

Thereby, an embodiment in which the rotation point of the oscillating lever lies on the front connecting pin facing in the direction of travel, on the line of efficacy between the overall center of gravity of the vehicle and the contact point of the wheels proves advantageous, since with the arrangement along this line the point of rotation of the oscillating lever is not additionally stressed by torque due to braking forces during a braking maneuver using the front brakes, as a result of which there is no spring feedback through the braking forces. Of course this arrangement is suitable both for front and rear axles.

An embodiment in which all the hollow profiles have vertical parting sections is also advantageous, since it guarantees rational manufacturing of components, whereby further processing is not required.

The embodiment in which a steering linkage is provided, including a steering rod lever connected rigidly to a steering rod, as well as a relay lever capable of swivelling on the steering rod lever around a rotational axis parallel to the steering rod and which is connected to an eccentric shaft by a crank joint is particularly advantageous, whereby steering of the vehicle is independent of compression as a result of the construction. Normally, the steering rod is connected to the steering arms of the steering stubs via a ball joint. This allows some degree of swivel movement of the steering rod around it longitudinal axis. A relay lever arranged so as to be capable of swivelling around an axis parallel to the steering rod can balance out spacing changes together with the steering lever. A steering lever is mounted rigidly on the steering rod with a hinge at the upper end, the rotational axis of which is parallel to the steering rod. A relay lever is pivoted to the rotational axis of the steering lever, thus being capable of swivelling around an axis parallel to the steering rod. The relay lever is connected to the eccentric shaft so as to be articulated. This construction transfers movements of the eccentric shaft parallel to the steering rod directly to the joints of the steering stubs, but it can balance out the changeable spacing of the eccentric shaft vertical to the steering rod.

BRIEF DESCRIPTION OF THE DRAWINGS

In the following, the invention is explained in more detail based on the embodiments illustrated in the figures.

The figures show the following.

DETAILED DESCRIPTION OF THE PRESENT INVENTION

By way of introduction, it is noted that in the described embodiment the same parts are allocated the same reference numbers and the same component names, whereby the disclosures contained throughout the description can be applied by analogy to the same parts with the same reference numbers or same component names. Furthermore, position details given in the description, e.g. top, bottom side, etc., relate to the figures being described and illustrated at the time and with a change of position should be transferred accordingly to the new position. Furthermore, individual features of the illustrated embodiment may themselves represent independent solutions in accordance with the invention.

Figure 1:
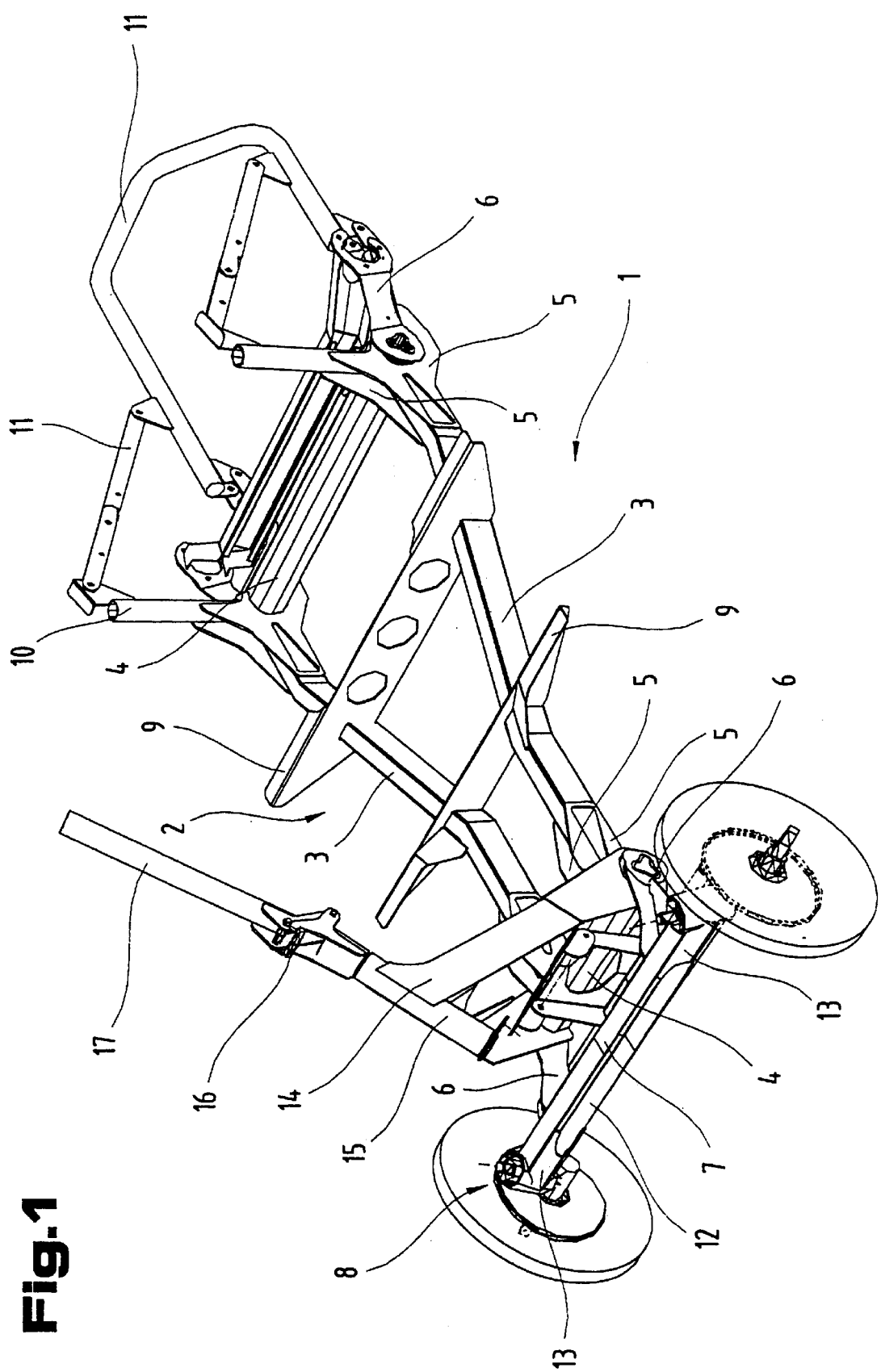
FIG. 1 an oblique view.

FIG. 1 shows an undercarriage 1 or chassis for a four-wheel motorized vehicle for transportation of at least one person. In its basic construction, this vehicle undercarriage 1 comprises one main frame 2, which is made up of a more or less ring-shaped arrangement of closed hollow profiles. This main frame 2 is made preferably of two lateral hollow profiles 3 and two diametrically opposed torsion springs 4, whereby the rotational axes of the torsion springs 4 are arranged crosswise to the vehicle's direction of travel. With this embodiment of the main frame 2 with hollow profiles, a torsion-resistant superstructure of the vehicle is also possible. This is made possible by the fact that each lateral hollow profile 3 of the main frame 2 is connected to the torsion springs 4 so as to be flexion-and torsion-resistant. This flexion and torsion resistance is achieved by providing the connection preferably with plane gusset plates 5. The gusset plates 5 are mounted bilaterally on the lateral hollow profiles 3, whereby the welding joint is located on the neutral plane of the main flexural stress of each connecting profile, in this case the lateral hollow profiles 3. Extension stresses on the welding joint can be avoided in such a case of stress, thus providing advantages with regard to the strength of the welding joint. In addition, a flexurally stiff connecting pin 7 is provided at the torsion springs 4 via the oscillating lever 6. The connecting pin 7 has a mounting 8 for the wheels of the vehicles at its ends.

The lateral hollow profiles have fixtures 9 for the body of the vehicle arranged crosswise in relation to the direction of travel. Moreover, vertical supports 10 for this body can be arranged on the gusset plates 5 for the rear torsion spring 4. Additional fixtures or bearing frames 11 can, even if they project beyond the rear torsion spring 4, could be mounted on the main frame 2 and/or the supports 10 using the gusset plates 5.

The connecting pin 7 is designed as a torsion-elastic open profile 12 in the area between the oscillating levers 6. In the area between the oscillating lever 6 and the mounting 7, a flexure- and torsion-resistant reinforcement 13 is provided, so that the type of reinforcement 13 can create a hollow profile. By choosing the length of the reinforcement 13 accordingly, the torsion resistance of the connecting pin 7 can be varied. Since the relation between flexural stiffness and torsion resistance of a profile rod, in this case of connecting pin 7, can be changed by the design of the profile cross-section in many areas, it is possible to link the individual compressions with each other on one axle. High torsion resistance leads to stronger coupling of the compression, thus actively preventing rolling of the vehicle. In addition, this construction also permits controlled torsion of the connecting pin 7.

The control panel 14 for steering the vehicle is mounted on the torsion spring 4, the front torsion spring facing in the direction of travel. On this control panel 14, which can be designed in two parts and each part of which is mounted close to the oscillating lever 6, a camshaft tube 15 with an internal steering tube is mounted. A handlebar 17 is connected to this steering tube 15 via a connecting element 16.

The general advantage of this type of construction is the fact that all the connections between the individual components can be made exclusively using welding joints. Moreover, it is technically optimal and rational in terms of manufacturing that all the hollow profiles, like for example the lateral hollow profile 3, the torsion spring 4 or the connecting pin 7 have vertical parting sections.

Figure 2:
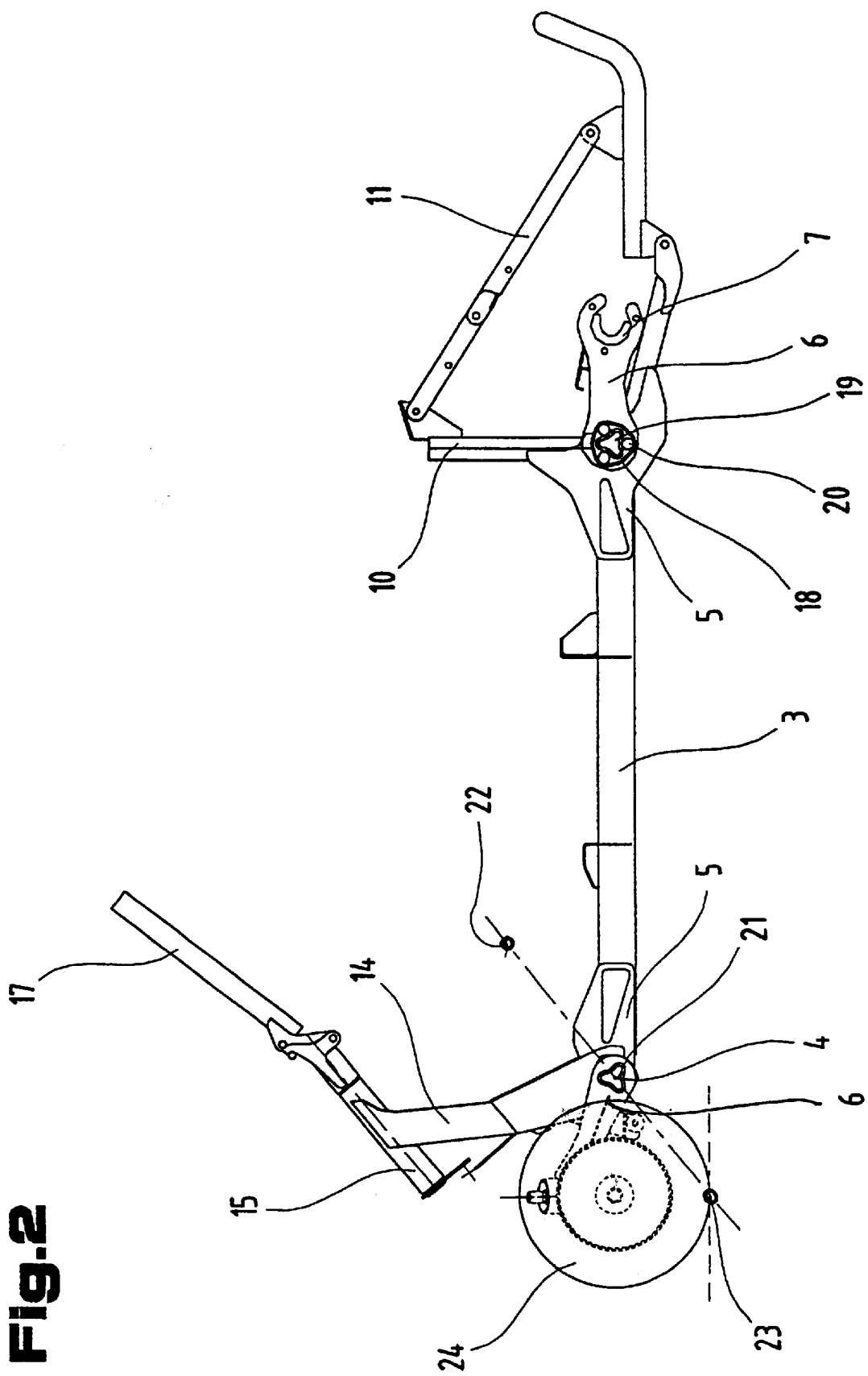
FIG. 2 a side view.

In accordance with FIG. 2, the torsion springs 4 are attached to the lateral hollow profiles 3 via the gusset plates 5. Moreover, the oscillating levers 6 are provided on the torsion springs 4 for both the front and the rear connecting pins 7. In addition, the bearing frame 11 is provided on the support 10 or on the gusset plate for the rear rotational axis 4, for example for the cage of the vehicle. Equally, the control panel 14 with the steering tube 15 and handlebar 17 is mounted on the front torsion spring 4.

The torsion spring 4 comprises two concentrically arranged hollow profiles, whereby the outer hollow profile is a torsion spring tube 18 and the inner hollow profile is a torsion spring axis 19. At least one elastomer element 20 is arranged between the torsion spring tube 18 and the torsion spring axis. With this arrangement of the torsion springs 4, sufficient longitudinal stiffness is achieved in the direction of its rotational axis and the vertical plane in relation to.

The oscillating levers 6 are rigidly attached to the connecting pin 7. in addition, the oscillating levers are designed so as to have low torsion resistance along their longitudinal axis, and they have a thin-walled, flat shape. As already mentioned, varying compression invariably causes torsional flexing of the connecting pin 7 in relation to the vehicle superstructure. In this case, twisting is forced upon the oscillating levers 6, which are connected rigidly to the connecting pin 7, and can exclusively perform a rotational movement crosswise to the direction of travel. Therefore, the oscillating levers 6 are designed so as to have low torsion resistance along the longitudinal axis, in order to be able to achieve the necessary axle compression.

The rotation point 21 of the oscillating lever 6 lies on the front connecting pin 7 (facing in the direction of travel) on the—dotted—line of efficacy between the overall center of gravity 22 of the vehicle and the contact point 23 of the tires 24 on the wheels. Thus, the rotation point 21 of the oscillating lever 6 is not additionally subject to torque due to braking forces during a braking manuever with the brakes, and there is no spring feedback due to the braking forces.

Figure 3:
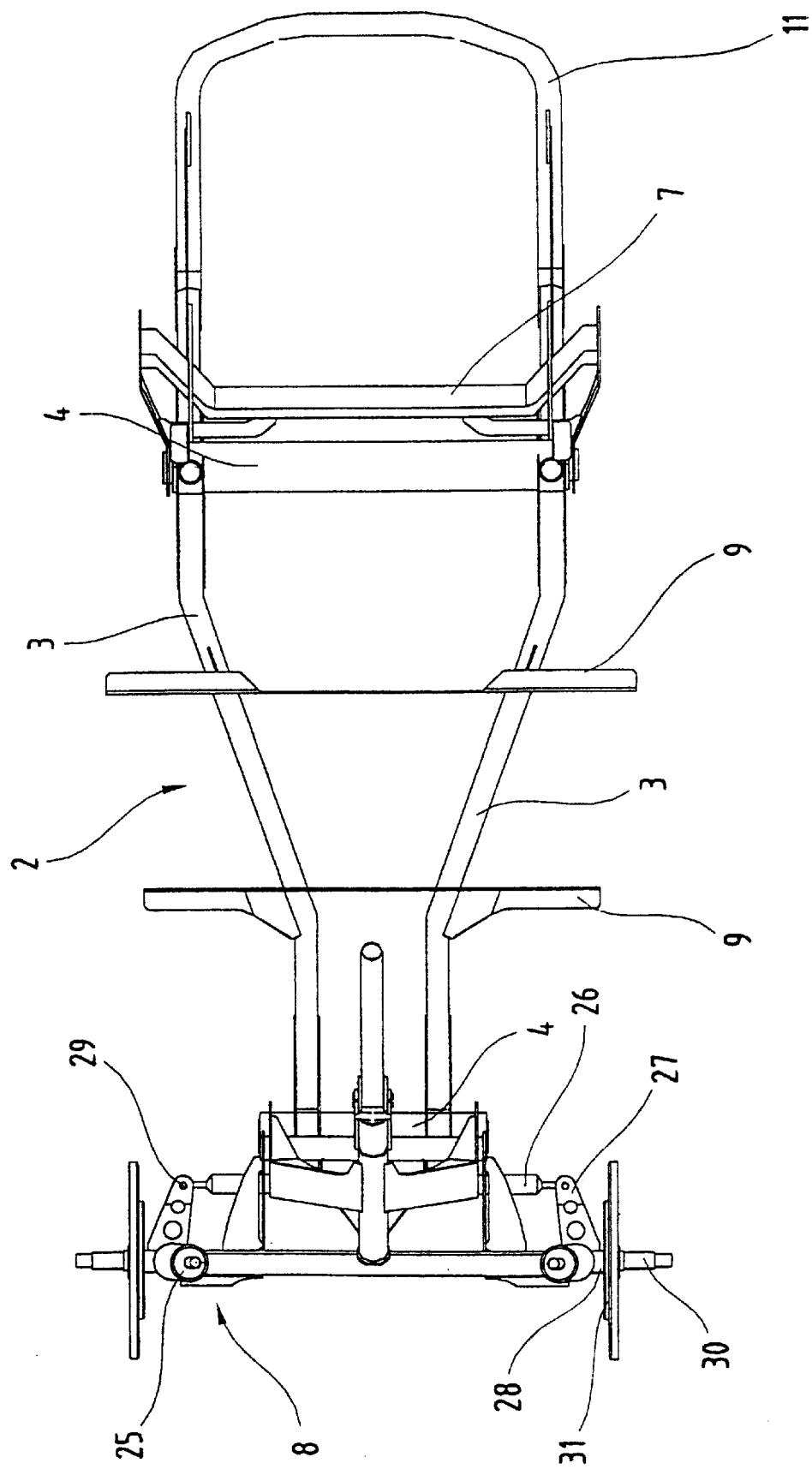
FIG. 3 a top view of the vehicle undercarriage in accordance with the invention, and FIG. 4 part of the steering construction.

In accordance with FIG. 3 the main frame 2 comprises the lateral hollow profiles 3 and the torsion springs 4 has fittings 9 for the vehicle body. The bearing frame 11 may project beyond the rear torsion spring 4 facing in the direction of travel.

The connecting pin 7 is also mounted on the rear torsion spring 4 via the oscillating lever 6. The connecting pin 7 can be offset, for example for mounting of the drive.

The front connecting pin 7 with the mounting 8 on both sides, in particular in this case with a steering stub mounting 25 and the steering construction, which is designed as a cassette construction, is mounted on the front tension spring 4. The steering construction basically comprises a steering rod 26, which is connected via a ball joint each to the steering levers 27 that can be arranged on both sides. The steering levers in turn are connected with steering stubs 28, which form a unit with the connecting pin 7 via the steering stub mounting 25. Since the steering rod 26 is connected to the steering levers 27 of the steering stub 28 via a ball joint 29, a certain scope of swivel movement of the steering rod 26 around its longitudinal axis is possible.

On the steering stubs 28, wheel hubs 30 are provided for the wheel bearings, whereby these wheel hubs 30 are fitted with braking discs 31.

Figure 4:
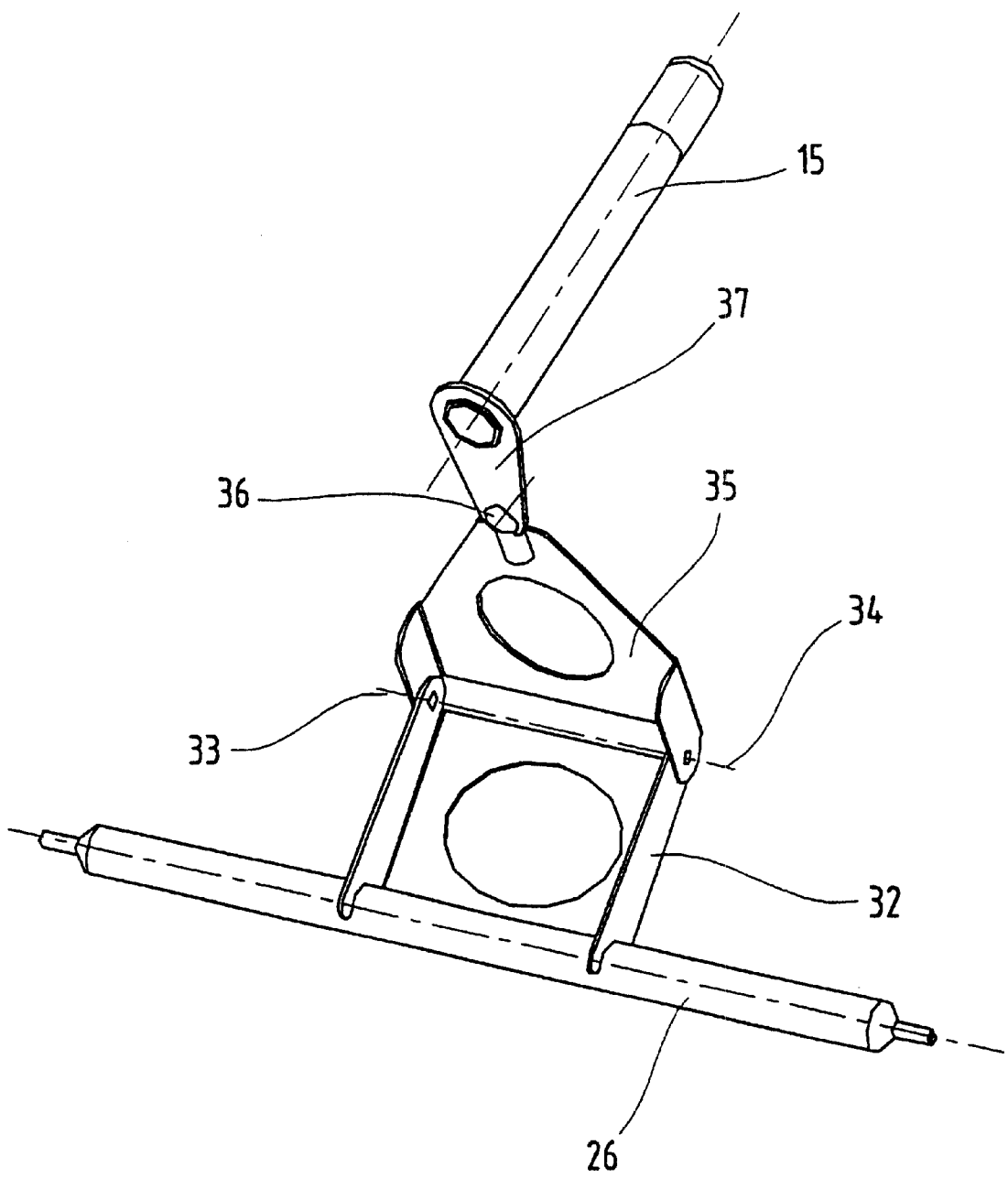

FIG. 4 shows the steering construction in detail. A steering lever 32 is mounted rigidly on the steering rod 26, whereby a rotating joint 33, the rotational axis 34 of which is parallel to the steering rod 26, is provided at the upper end. On the rotating joint 33, a relay lever 35 is pivoted to the rotational axis 34 of the steering lever 32, thus being capable of swivelling around an axis parallel to the steering rod 26. The relay lever 35 is connected via a crank joint 36 to an eccentric shaft 37 that is attached to the steering tube 15.

This steering construction transmits movements of the eccentric shaft 37 via the steering rod 26 and parallel to it directly to the joints for moving the wheels. In addition, this steering construction can balance out the varying distance from the eccentric shaft 37 vertical to the steering rod 26.

In conclusion, it is noted that for a better understanding of the solution in accordance with the invention, the components are illustrated partly untrue to scale and/or are enlarged or illustrated schematically in the embodiments described above. Moreover, individual parts of the combination of features from the embodiment illustrated and described can represent independent inventive solutions or solutions according to the invention in themselves when combined with other individual features.

In particular, the individual embodiments illustrated in FIGS. 1 to 4 can present individual solutions in accordance with the invention. The relevant aims and solutions in accordance with the invention can be found in the detailed descriptions of these Figures.

List of references

1 Vehicle undercarriage
2 Main frame
3 Lateral hollow profile
4 Torsion spring
5 Gusset plate
6 Oscillating lever
7 Connecting pin
8 Mounting
9 Fixture
10 Support
11 Bearing frame
12 Profile
13 Reinforcement
14 Control panel
15 Steering tube
16 Connecting element
17 Handlebar
18 Torsion spring tube
19 Torsion spring axis
20 Elastomer element
21 Rotation point
22 Overall center of gravity
23 Contact point
24 Tire
25 Steering stub mounting
26 Steering rod
27 Steering lever
28 Steering stub
29 Ball joint
30 Wheel hub
31 Brake disk
32 Steering rod lever
33 Rotating joint
34 Rotational axis
35 Relay lever
36 Crank joint
37 Eccentric shaft

What is claimed is:

1. A vehicle undercarriage or chassis for a vehicle comprising:
   at least one main frame comprising an arrangement of closed hollow profiles in which two lateral hollow profiles and two torsion springs are arranged as a roughly ring-shaped, flexure- and torsion-resistant arrangement;
   gusset plates;
   said torsion springs being diametrically opposed with an axis of revolution extending crosswise to a direction of vehicle travel, and having outer tubes coupled to said lateral hollow profiles via said gusset plates;
   oscillating levers;
   at least one flexurally resistant connecting pin being coupled to said torsion springs via said oscillating levers, said connecting pin having mountings, wherein each end of said connecting pin includes one of the mountings and wherein each of the mountings is configured to receive a wheel,
   whereby said connecting pin comprises a profile with low torsion resistance in an area between said oscillating levers and low torsion-resistance along a longitudinal axis.

2. The vehicle undercarriage in accordance with claim 1, wherein said at least one main frame is structured and arranged for a four wheeled vehicle for transporting at least one person.

3. The vehicle undercarriage in accordance with claim 1, wherein connections between individual parts are made with welding joints.

4. The vehicle undercarriage in accordance with claim 1, wherein at least one of said torsion springs comprises two concentrically arranged hollow profiles, whereby at least one elastomer element is positioned between said hollow profiles.

5. The vehicle undercarriage in accordance with claim 4, wherein said at least one elastomer element is positioned in a mounting area of at least one of said oscillating levers.

6. The vehicle undercarriage in accordance with claim 1, wherein at least one of said torsion springs further comprises an elastomer spring element and a torsion spring axis.

7. The vehicle undercarriage in accordance with claim 1, further comprising additional connecting profiles and additional flat gusset plates,
   wherein said additional flat gusset plates are arranged on both sides of each of said lateral hollow profiles to provide a connection between each of said lateral hollow profiles and said additional connecting profiles.

8. The vehicle undercarriage in accordance with claim 1, wherein said gusset plates coupling said lateral hollow profiles to said torsion springs are arranged on both sides of each said lateral hollow profile.

9. The vehicle undercarriage in accordance with claim 1, wherein said at least one connecting pin comprises an open profile in an area between said oscillating levers.

10. The vehicle undercarriage in accordance with claim 1, wherein said at least one connecting pin comprises a flexure- and torsion-resistant reinforcement in an area between one of said oscillating levers and one of the mountings.

11. The vehicle undercarriage in accordance with claim 1, wherein at least one of said mountings comprises a steering stub mounting.

12. The vehicle undercarriage in accordance with claim 1, wherein said at least one connecting pin comprises a hollow profile in an area between one of said oscillating levers and one of said mountings.

13. The vehicle undercarriage in accordance with claim 1, wherein each of the mountings comprises a steering stub mounting.

14. The vehicle undercarriage in accordance with claim 1, wherein said oscillating levers are rigidly coupled to said at least one connecting pin.

15. The vehicle undercarriage in accordance with claim 1, wherein each of said oscillating levers comprises a thin-walled, flat shape.

16. The vehicle undercarriage in accordance with claim 1, wherein said at least one connecting pin comprises a front connecting pin arranged to face in the travel direction, a rotation axis of said oscillating levers lies on said front connecting pin on a line of efficacy between an overall center of gravity of the vehicle and a contact point of the wheels located at the front of the vehicle.

17. The vehicle undercarriage in accordance with claim 1, wherein each of said lateral hollow profiles is coupled to a vertical parting section.

18. The vehicle undercarriage in accordance with claim 1, further comprising a steering linkage comprising a steering rod lever rigidly coupled to a steering rod.

19. The vehicle undercarriage in accordance with claim 18, wherein said steering linkage further comprises a relay lever swivelably coupled to said steering rod lever around a rotational axis parallel to said steering rod, and said relay lever being coupled to an eccentric shaft by a crank joint.

20. A vehicle undercarriage or chassis for a vehicle comprising:
    two lateral closed hollow profiles and two torsion springs forming a main frame arrangement, the main frame arrangement being a flexure- and torsion-resistant arrangement;
    gusset plates connected to the main frame arrangement;
    said two torsion springs being diametrically opposed with an axis of revolution extending crosswise to a direction of vehicle travel;
    each of said two torsion springs including an outer tube coupled to said lateral hollow profiles via said gusset plates;
    two oscillating levers coupled to each of said two torsion springs;
    at least one flexurally resistant connecting member being coupled to at least one of said two torsion springs via said oscillating levers;
    said at least one flexurally resistant connecting member having two ends wherein each of said two ends has a mounting configured to receive a wheel; and
    said at least one flexurally resistant connecting member comprising a profile with low torsion resistance in an area between said oscillating levers and low torsion-resistance along a longitudinal axis.

21. A vehicle undercarriage or chassis for a vehicle comprising:
    two lateral closed hollow profiles;
    a first torsion spring being coupled to a first end of the two lateral closed hollow profiles;
    a second torsion spring being coupled to a second end of the two lateral closed hollow profiles;
    the two lateral closed hollow profiles and the first and second torsion springs forming a main frame that is flexure-and torsion-resistant;
    the first and second torsion springs being arranged to be diametrically opposed with an axis of revolution extending crosswise to a direction of vehicle travel;
    each of the first and second torsion springs having an outer tube coupled to said lateral closed hollow profiles via gusset plates;
    two oscillating levers coupled to the first torsion spring;
    two oscillating levers coupled to the second torsion spring;
    a first flexurally resistant connecting member being coupled to the first torsion spring via said two oscillating levers;
    a second flexurally resistant connecting member being coupled to the second torsion spring via said two oscillating levers;
    each of the first and second flexurally resistant connecting members having two ends wherein each of said two ends has a mounting configured to receive a wheel; and
    at least one of:
        the first flexurally resistant connecting member comprising a profile with low torsion resistance in an area between said two oscillating levers and low torsion-resistance along a longitudinal axis; and
        the second flexurally resistant connecting member comprising a profile with low torsion resistance in an area between said two oscillating levers and low torsion-resistance along a longitudinal axis.

* * * * *